United States Patent [19]
Jussila

[11] Patent Number: 5,967,348
[45] Date of Patent: *Oct. 19, 1999

[54] METHOD AND EQUIPMENT FOR TURNING THE WHEELS OF A CRANE MOVING ON RUBBER-TIRED WHEELS

[75] Inventor: Olavi Jussila, Hyvinkää, Finland

[73] Assignee: KCI Konecranes International Corporation, Hyvinkaa, Finland

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/765,802
[22] PCT Filed: Jul. 7, 1995
[86] PCT No.: PCT/FI95/00394
  § 371 Date: Apr. 22, 1997
  § 102(e) Date: Apr. 22, 1997
[87] PCT Pub. No.: WO96/02454
  PCT Pub. Date: Feb. 1, 1996

[30] Foreign Application Priority Data

Jul. 15, 1994 [FI] Finland ..................... 943400

[51] Int. Cl.⁶ ..................... B66C 5/02
[52] U.S. Cl. ............ 212/344; 180/264; 414/460
[58] Field of Search ............... 212/344; 180/23, 180/65.5, 264; 414/459, 460, 461

[56] References Cited

U.S. PATENT DOCUMENTS

| 553,082 | 1/1896 | Thew | 212/292 |
|---|---|---|---|
| 1,828,905 | 10/1931 | Mossay | 212/344 |
| 3,081,883 | 3/1963 | Minty | 212/344 |
| 3,280,931 | 10/1966 | Cahill et al. | 180/23 |
| 3,897,843 | 8/1975 | Hapeman et al. | 180/65.5 |
| 4,763,800 | 8/1988 | Engler et al. | 212/344 |
| 4,880,124 | 11/1989 | Feider et al. | 212/344 |
| 5,735,416 | 4/1998 | Jussila | 212/344 |

*Primary Examiner*—Thomas J. Brahan

[57] ABSTRACT

The invention relates to a method for turning a pair of wheels in a crane (1) moving on rubber-tired wheels or the like. The crane comprises an electric motor (28) with gearing (16), the electric motor functioning as traversing gear. When the wheels of the crane are turned, the locking device (15) prevents the wheels from turning is released, the crane is driven by the desired angle, and the locking device (15) preventing the wheels from turning is locked. Only one of the wheels (4a) in the pair of wheels is affected by the traversing gear of the crane, the other wheel (4b) being allowed to rotate freely.

9 Claims, 3 Drawing Sheets

METHOD AND EQUIPMENT FOR TURNING THE WHEELS OF A CRANE MOVING ON RUBBER-TIRED WHEELS

The invention relates to a method and equipment for turning the wheels of a crane moving on rubber-tired wheels or the like.

BACKGROUND OF THE INVENTION

In prior art, a sub-chassis of a crane moving on rubber-tired wheels comprises two large wheels one after the other, and the wheels can be turned to be parallel for lateral movement. The turning is conducted by turning the wheels to the same direction with a hydraulic cylinder or aggregate in a place specifically reserved for turning, e.g. on a marble slab. Another possibility is to lift the wheels from the ground for the duration of the turning action. Instead of two large wheels, the sub-chassis may comprise a pair of small wheels, both of which are drive wheels. Power transmission is usually implemented by open gearing with chain gears and transmission chains.

U.S. Pat. No. 3,081,883 discloses a solution in which a sub-chassis of a crane comprises four parallel wheels, the two on the outer edges being drive wheels. The sub-chassis can be turned by operating the chain-geared traversing gears of the drive wheels to different directions.

A disadvantage of the prior art arrangement is that turning is difficult. There are only two operating positions, 0° and 90°, and it is extremely difficult, practically impossible, to steer the crane diagonally e.g. for servicing purposes. Also, because of hydraulic equipment, many components are needed, and so there are many points that may leak. Further, in chain gearing there are many points that may need servicing, and in addition chain gearing requires space.

SUMMARY OF THE INVENTION

The object of the present invention is to overcome the above disadvantages and to provide a new and advantageous solution for turning a crane moving on rubber-tired wheels or the like.

Embodiments of the invention are characterized by what is set forth in the claims.

An advantage of the invention is that the forces caused by the turning action are reversed and the crane remains stationary during the turning. Another advantage is that the wheels can be turned without any additional apparatus, such as hydraulic equipment, and the turning can be performed anywhere. Yet another advantage is that the wheels can be turned steplessly, so it is possible to move the crane diagonally or in a circle. Also, the turning does not wear the tires notably.

BRIEF DESCRIPTION OF THE DRAWINGS

In the following, the invention will be described in greater detail by means of one embodiment with reference to the drawings, in which.

DETAILED DESCRIPTION OF THE INVENTION

Figure 1:
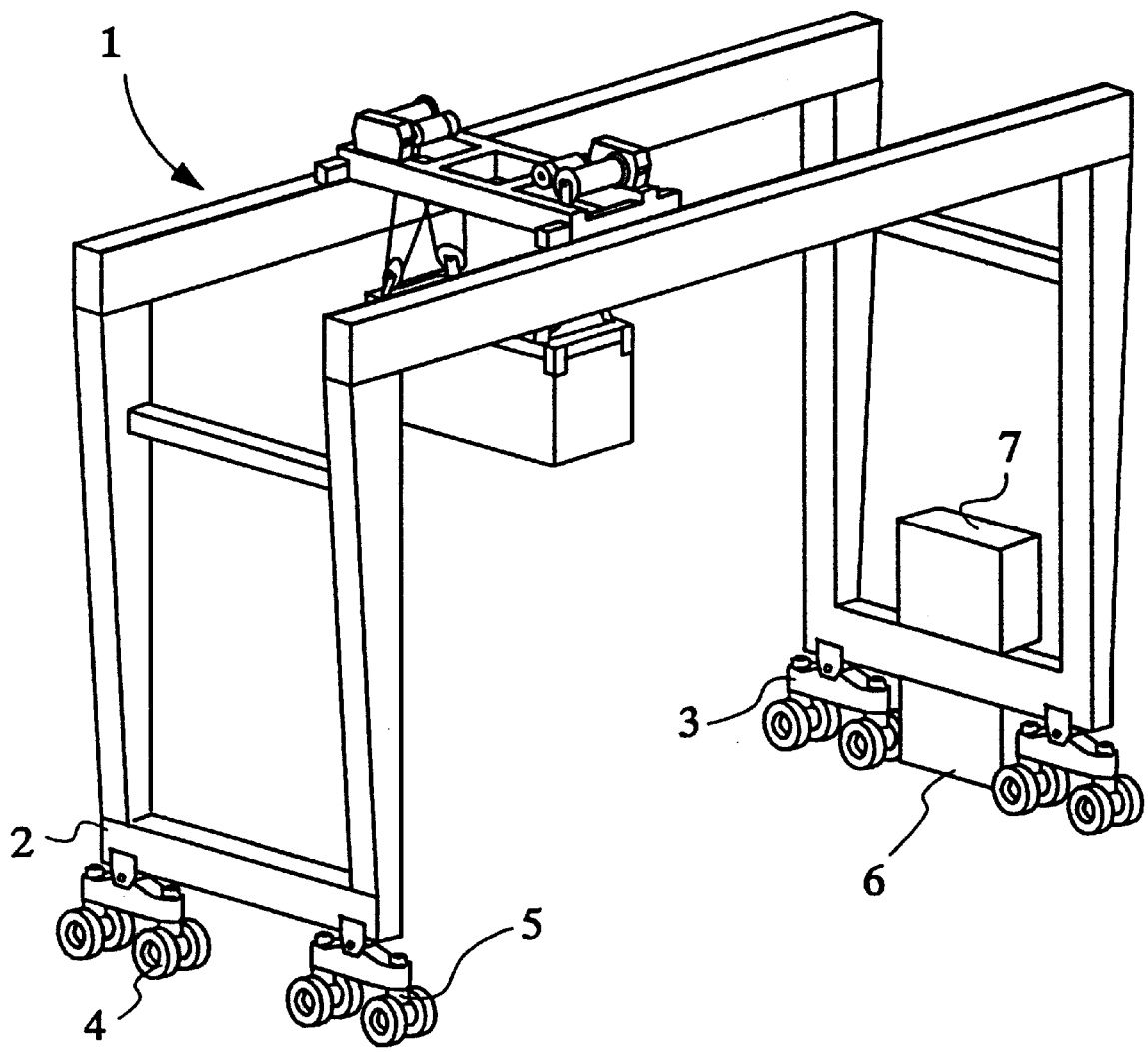
FIG. 1 shows a diagonal top view of a crane.

To illuminate the method, we shall first describe the structure of traversing and turning gear of the crane. FIG. 1 shows a crane 1 in which the invention is used, four sub-chassis assemblies 3 being fitted on two lower beams 2 of the frame structure at the lower corners of the crane. Each sub-chassis 40 comprises a support beam 41 and two pairs of wheels 4, each of the pairs of wheels being mounted on a horizontally extending shaft 19 (described below with respect to the gearing), each said shaft being interconnected to a vertical pipe 5 located at opposite ends of the sub-chassis such that the wheels pivot about the vertical axis of the vertical pipe. The crane is also provided with a diesel generator 6, which supplies the crane with power, and an electric distribution unit 7. The traversing gear of the crane, which is not shown in FIG. 1, is arranged in connection with the pairs of wheels 4 and comprises e.g. a secondary shaft 19, gearing 16, an electric motor 28, and a brake 32 affecting the shaft of the electric motor.

Figure 2:
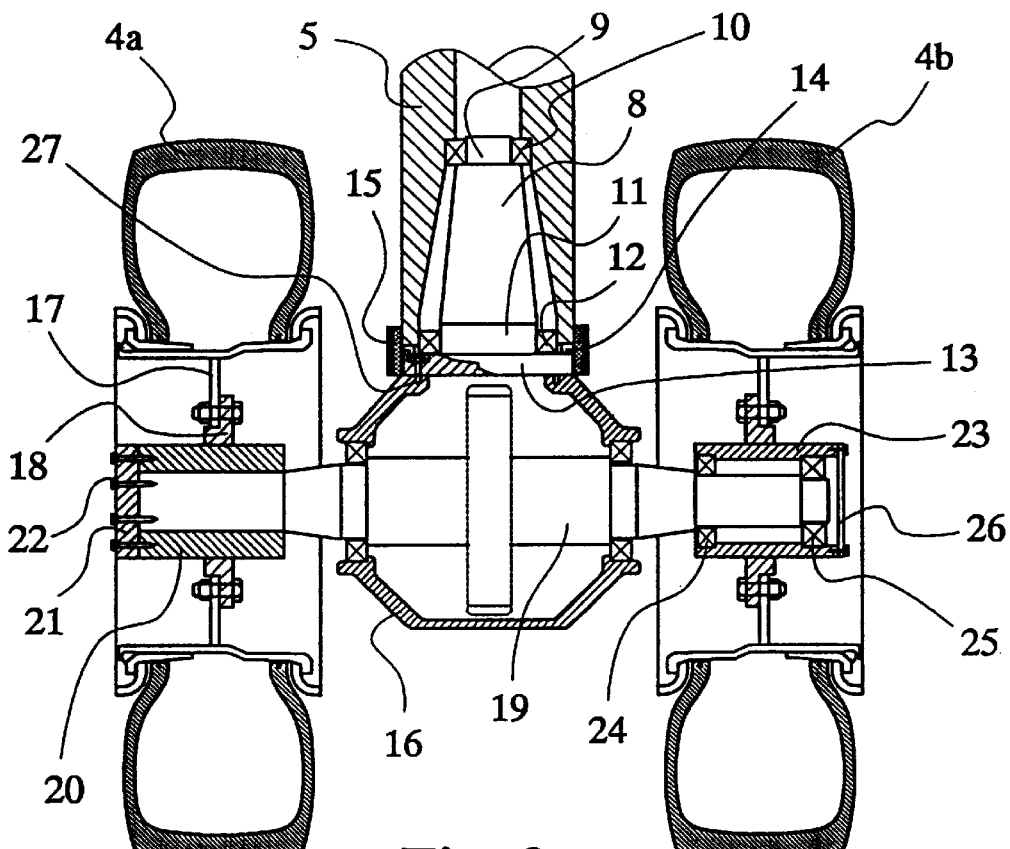
FIG. 2 shows a shaft arrangement in one pair of wheels on a sub-chassis in the longitudinal direction of the sub-chassis.
Figure 3:
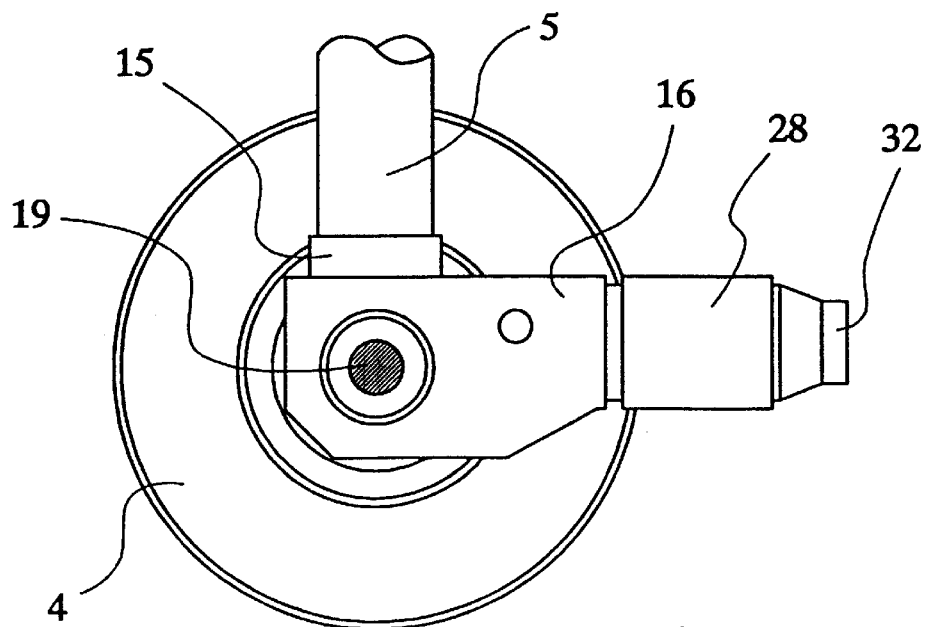
FIG. 3 shows a side view of one wheel and traversing gear of the sub-chassis.

FIG. 2 shows the structure in greater detail. At both ends of the sub-chassis, a vertical pipe 5 extends downward from the sub-chassis; the pipe is hollow, and expands conically on the inside toward the bottom. At the upper end of the conical expansion there is a space for a bearing 10, and at the lower end of the expansion there is a space for a lower bearing 12. Each pair of wheels 4 is mounted on a conical hole in the vertical pipe to pivot about the vertical axis of the hole by means of a king pin 8, which comprises an upper cylindrical bearing area 9 for bearing 10 and a lower cylindrical bearing area 11 for bearing 12. The part of the king pin between the bearing areas narrows conically toward the top, and so the diameter of bearing area 9 is smaller than that of bearing area 11. Immediately below bearing area 11 the king pin comprises a cylindrical flange 13, whose diameter is greater than that of bearing area 11. The flange provides a supporting surface for bearing 12, and the king pin is fastened at this flange to the frame of the gearing 16 between the wheels 4a and 4b in the pairs of wheels 4 with fastening bolts 27.

At the lower end of the vertical pipe 5 there is also a locking device, such as a band brake 15, affecting the lower end of the vertical pipe and the flange 13 of the king pin 8, the locking device being springdrivenly pressed against the lower end of the vertical pipe and the perimeter of the flange as the brake is in the hold position, which prohibits the vertical pipe from turning in relation to the combination of a gear box and a pair of wheels. The brake is released by means of a spindle motor (not shown in the figs.) or the like as the wheels are turned. Between the flange 13 and the lower end of the vertical pipe there is also a packing 14 that prevents the lubricant of the bearing from coming into contact with the braking area of the band brake.

The shaft 19 of the gearing is mounted on the frame of the gear box 16 in an essentially horizontal position. At a first end of the shaft there is a fastening bush 20 locked in place with a wedge and encircled by a fastening flange 18 fixed to the perimeter of the bush. To prohibit axial movement, the bush 20 is also fastened to the secondary shaft 19 with bolts 22 and an end flange 21, through which the bolts 22 extend to the bush 20 and the shaft 19. On a second end of the shaft 19 is mounted a fastening bush 23 rotating about the shaft 19. The bush is encircled by a fastening flange that is fixed to the perimeter of the flange and is identical to the fastening flange 18 at the first end. The fastening bush 23 is hollow and has on the inner surface spaces arranged to receive bearings 24 and 25 encircling the shaft 19. To prevent dirt from entering the bearings, the open end of the fastening bush 23 is sealed with a cover 26.

The drive wheel 4a in the pair of wheels 4 is fastened at its rim 17 to the fastening flange 18 with bolts, so that the drive wheel 4a is positively driven to rotate with the secondary shaft 19 to the same direction as the secondary shaft. Further, the free wheel 4b in the pair of wheels 4 is fastened at its rim to the fastening flange 18 with bolts, whereby the free wheel 4b rotates freely with the fastening bush 23, irrespective of the rotation of the secondary shaft. The electric motor 28, which functions as a traversing motor for the crane, is connected at one end to the gearing 16. At the other end of the electric motor there is a brake.

Figure 4:
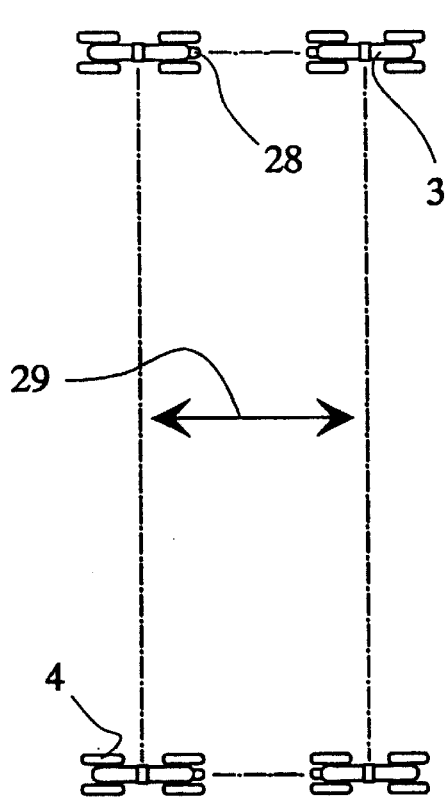
FIG. 4 shows as a top view the mutual position of a pair of wheels on a sub-chassis when the crane in steered to the lateral direction.

The method for turning a crane operates as described below. Usually, when a crane is steered to the lateral direction (direction indicated by arrow 29 in FIG. 4), the pairs of wheels 4 on the sub-chassis 3 are one after the other in the longitudinal direction of the sub-chassis. The band brake 15, which functions as a locking device, is locked and although only wheels 4a operate as drive wheels, the crane moves in a straight line thanks to the locking effect of the band brake. If one wants to change the direction of travel, the band brake 15 is released, whereby the pair of wheels is able to turn about the symmetrically positioned vertical axis of the pair, the vertical axis coinciding with the vertical axis of the vertical pipe 5 at the end of the sub-chassis and with the vertical axis of revolution of the king pin 8. A turning action takes place since only one of the wheels in the pair of wheels operates as a drive wheel, while the other is a free wheel. At one end, the pairs of wheels on both sub-chassis assemblies are arranged to turn simultaneously to opposite directions as the crane is turned, whereby the forces caused by the turning action are reversed and the crane remains stationary. As compared with the position of wheels in FIG. 4, the pairs of wheels on the upper sub-chassis on the left in FIG. 5 have been turned counter-clockwise (indicated by small arrows), and the pairs of wheels on the upper sub-chassis on the right have been turned clockwise (indicated by small arrows). In the lower sub-chassis assemblies of the figure, the turning directions are reversed. After the turning, the band brake 15 is locked and the crane is ready to be steered to the new direction. The turning action is performed by the traversing gear of the crane, which comprises e.g. the above-mentioned electric motor 28 and the gear box 16 with gearing.

Figure 5:
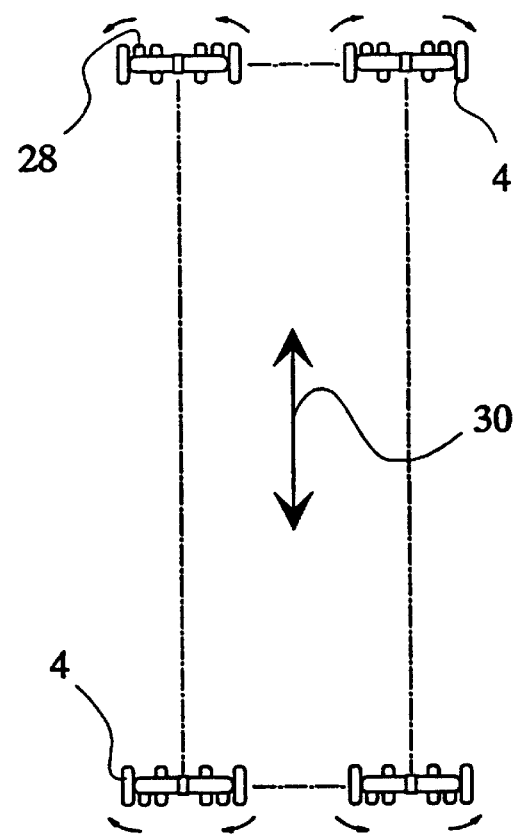
FIG. 5 shows as a top view the mutual position of a pair of wheels on a sub-chassis when the crane in steered to the longitudinal direction.

In FIG. 5, the wheels of the crane are in position for longitudinal travel (indicated by arrow 30). On a sub-chassis, the two pairs of wheels are then next to each other and not one after the other like in the embodiment above. The traversing motors 28 are here on the same side of the sub-chassis 3, whereas in the above embodiment they are in the longitudinal direction of the sub-chassis.

Figure 6:
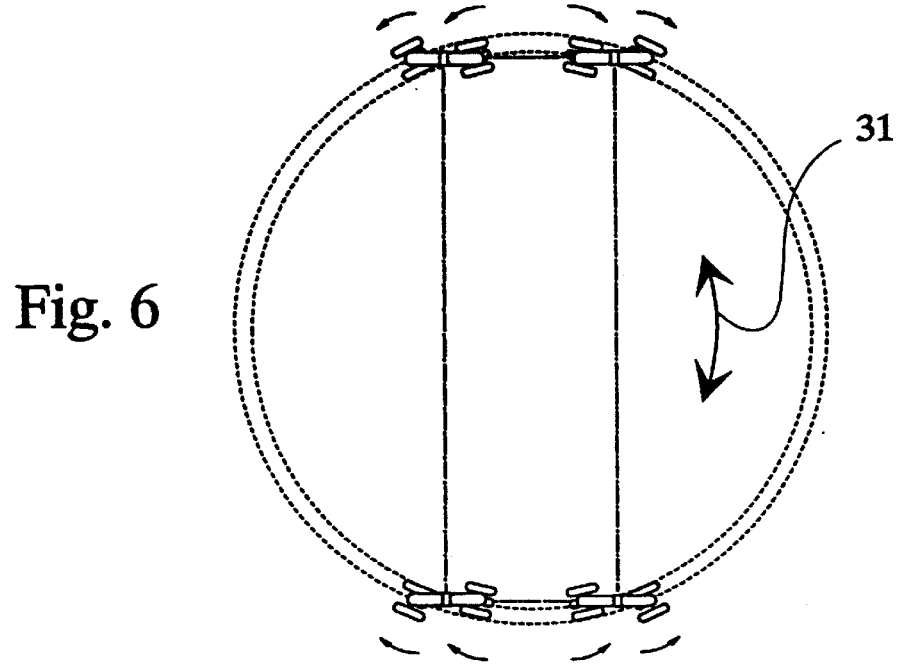
FIG. 6 shows as a top view the mutual position of a pair of wheels on a sub-chassis when the crane in steered in a circle.

FIG. 6 illustrates steering in a circle (arrow 31), which is made possible by the invention. To enable steering in a circle, both pairs of wheels on a sub-chassis are turned by an angle that is dependent on the dimensions of the crane. The angle is slightly different for the two pairs of wheels. FIG. 6 also shows that the pairs of wheels on two successive sub-chassis assemblies at one end are turned to different directions: in the figure, the pairs of wheels on the sub-chassis on the left are turned counter-clockwise, and the pairs of wheels on the sub-chassis on the right are turned clockwise. At the lower end, the turning directions of the pairs of wheels are reversed. For diagonal movement, all the wheels are always turned to the same direction.

The driving and turning action of the crane are implemented by PLC control. The secondary shaft 19 comprises a pulse detector arrangement, which calculates the turning angle of the secondary shaft, starting from a specified zeroing point. The pulse calculation information is supplied to a control circuit, which forwards it to the electric motor 28. The calculation conducted by the pulse detector arrangement shows the turning angle of the wheels, and the wheels can also be adjusted to a desired angle by this arrangement. In the positions for lateral travel shown in FIG. 4 and longitudinal travel shown in FIG. 5, the pulse detector arrangement comprises extra control limits that are 90 degrees apart. At the control limits, the pulse detector information is zeroed, so that the system will always know the position of the wheels. The angle of the wheels is adjusted by changing the position of a zeroing detector, which functions as a control limit and is located at a zeroing point. This is a much easier way of adjusting the angle of the wheels than the hole/pin combinations which are used in prior art systems and where the intermediate position is difficult to change.

It will be obvious to one skilled in the art that the different embodiments of the invention are not limited to the example described above but may vary within the scope of the attached claims. For example, the traversing gear can be modified in many ways to implement the above method. Further, the forces caused by the turning action can also be reversed in the sub-chassis and not only in the end portion as described above. The two pairs of wheels on a sub-chassis thus turn simultaneously to different directions, whereby the turning forces are reversed in the sub-chassis. Another possible application is that no sub-chassis assemblies are used at all, but rather than a sub-chassis, each corner of the crane has only one pair of wheels.

I claim:

1. A crane comprising:
   a frame with two lower beams,
   a sub-chassis assembly disposed at both end portions of each said lower beam, each said assembly having a support beam and at least two wheel assemblies, wherein
   each wheel assembly includes
   a vertical pipe extending from an end portion of the support beam,
   a gear box having gearing and a frame, the frame being attached to a lower end of the vertical pipe and rotatable about the vertical axis thereof,
   an essentially horizontal shaft extending through and extending outward from opposite sides of the gear box,
   a pair of wheels, one of said wheels being mounted at each of the opposite end portions of the horizontal shaft such that the pair of wheels is pivotable about the vertical pipe, a first wheel of the pair of wheels being a drive wheel connected to one of the opposite end portions of the shaft and a second wheel being a free wheel,
   a crane traversing and turning gear connected to the gearing, the gear comprising an electric motor and gearing for positively driving the first wheel to rotate,
   a king pin provided inside the vertical pipe and pivoting about its axis, a lower end thereof being fastened to the gear box, a locking device disposed about the lower end of the vertical pipe for locking the vertical pipe and the pin in a certain position and for preventing the vertical pipe from turning.

2. The wheel assembly of claim 1, wherein the braking mechanism is a band brake for affecting rotation of each of said pair of co-axially arranged aligned support wheels about said vertical pivot;

when the locking device is unlocked, drive of said first one or said support wheels turns the wheels through a predetermined angle.

3. A wheel assembly supporting one corner of a crane or overhead device comprising:

at least two coaxially arranged support wheels;

a vertical pivot supporting the corner of the crane or overhead device and having a pivot axis, the pivot axis of said vertical pivot defining a plane orthagonal to the axis of said coaxially arranged support wheels to divide the wheel assembly into first and second wheel assembly sides;

a motor driving at least a first one of said support wheel on the first wheel assembly side, all drive to said support wheels being on said first wheel assembly side and none of the drive wheels on the said second wheel assembly side being driven;

a braking mechanism selectively locking said pivot axis against rotation;

said motor operable during locking of said braking mechanism to move the corner of the crane or overhead device and being operable when said braking mechanism is unlocked to rotate said wheel assembly around said pivot axis.

4. A method of driving a wheel assembly of a crane or overhead device comprising the steps of:

providing at least two coaxially arranged support wheels arranged around a vertical pivot supporting the corner of the crane or overhead device and having a pivot axis, the pivot axis of said vertical pivot defining a plane orthagonal to the axis of said coaxially arranged support wheels dividing the wheel assembly into first and second wheel assembly sides;

providing a motor driving at least one said support wheel on the first wheel assembly side;

driving only support wheels on the first wheel assembly side without driving any support wheels on the second wheel assembly side;

selectively locking said pivot axis against rotation and driving said motor to move the corner of the crane or overhead device in a desired direction; and selectively unlocking said pivot axis and driving said motor in a desired direction to rotate said wheel assembly around said pivot axis to align said wheels as desired.

5. The method of claim 4 wherein said step of selectively unlocking causes said co-axially arranged support wheels to pivot around said vertical pivot so that a differential between the force supplied by said drive wheel on the first opposed side of said vertical pivot and said undriven free wheels on said second side of said pivot causes said wheel assembly to pivot around said vertical pivot.

6. The wheel assembly of claim 4 wherein said realignment is due to the differential force applied about said pivot by said driven first wheel and said undriven free wheels.

7. The wheel assembly of claim 4 wherein a pair of said wheel assemblies are located at each of four corners of said crane.

8. The wheel assembly of claim 4 wherein said wheels are rubber-tired.

9. The wheel assembly of claim 4 wherein said motor is an electric motor.

* * * * *